US006339897B1

(12) United States Patent
Hayes et al.

(10) Patent No.: US 6,339,897 B1
(45) Date of Patent: Jan. 22, 2002

(54) METHOD AND APPARATUS FOR DISPENSING AIRBORNE MATERIALS FOR CONTROLLING PESTS

(75) Inventors: Donald J. Hayes, Plano; Christopher J. Frederickson, Little Elm; Murray Sinks, Dallas, all of TX (US)

(73) Assignee: MicroFab Technologies, Inc., Plano, TX (US)

( * ) Notice: Subject to any disclaimer, the term of this patent is extended or adjusted under 35 U.S.C. 154(b) by 0 days.

(21) Appl. No.: 09/801,994

(22) Filed: Mar. 8, 2001

Related U.S. Application Data

(63) Continuation of application No. 09/110,486, filed on Jul. 6, 1998, now abandoned.

(60) Provisional application No. 60/051,900, filed on Jul. 8, 1997.

(51) Int. Cl.[7] .......................... A01M 13/00; A01M 7/00; A01M 1/20

(52) U.S. Cl. ............................ 43/132.1; 43/125; 43/900

(58) Field of Search ............................ 43/107, 110, 111, 43/124, 125, 132.1, 900; 119/6.5; 102/311, 200; 89/1.11; 239/67, 4, 102.2, 99; 137/78.1, 78.5, 79, 80; 251/129.06; 449/1, 2; 128/202.21, 200.14, 200.16, 200.21, 200.18, 203.12

(56) References Cited

U.S. PATENT DOCUMENTS

| | | | | | |
|---|---|---|---|---|---|
| 3,793,762 | A | * | 2/1974 | Stains | 43/124 |
| 4,159,672 | A | * | 7/1979 | Garguilo et al. | 454/337 |
| 4,265,248 | A | * | 5/1981 | Chuiton et al. | 600/303 |
| 4,310,474 | A | * | 1/1982 | Iyengar | 261/1 |
| 4,356,528 | A | * | 10/1982 | Coffee | 43/900 |
| 4,476,515 | A | * | 10/1984 | Coffee | 43/132.1 |
| 4,812,856 | A | * | 3/1989 | Wallace | 347/89 |
| 5,053,100 | A | * | 10/1991 | Hayes et al. | 156/294 |
| 5,092,864 | A | * | 3/1992 | Hayes et al. | 606/10 |
| 5,193,738 | A | * | 3/1993 | Hayes | 228/180.22 |
| 5,205,064 | A | * | 4/1993 | Nolen | 43/112 |
| 5,208,980 | A | * | 5/1993 | Hayes | 29/890.1 |
| 5,227,813 | A | * | 7/1993 | Pies et al. | 347/71 |
| 5,229,016 | A | * | 7/1993 | Hayes et al. | 222/590 |
| 5,235,352 | A | * | 8/1993 | Pies et al. | 347/71 |
| 5,333,785 | A | * | 8/1994 | Dodds et al. | 239/67 |
| 5,335,446 | A | * | 8/1994 | Shitetoyo | 43/125 |
| 5,340,025 | A | * | 8/1994 | Pearce | 239/67 |
| 5,433,809 | A | * | 7/1995 | Pies et al. | 156/268 |
| 5,435,060 | A | * | 7/1995 | Hayes et al. | 29/890.1 |
| 5,436,648 | A | * | 7/1995 | Stortz et al. | 347/10 |
| 5,508,200 | A | * | 4/1996 | Tiffany et al. | 436/44 |
| 5,565,148 | A | * | 10/1996 | Pendergrass, Jr. | 261/30 |
| 5,591,409 | A | * | 1/1997 | Watkins | 422/110 |
| 5,645,844 | A | * | 7/1997 | Henderson et al. | 424/405 |
| 5,849,208 | A | * | 12/1998 | Hayes et al. | 216/94 |
| 5,894,841 | A | * | 4/1999 | Voges | 128/203.12 |
| 5,904,916 | A | * | 5/1999 | Hirsch | 424/45 |
| 5,950,921 | A | | 9/1999 | Cain et al. | |
| 5,996,276 | A | | 12/1999 | Carter et al. | |
| 6,196,218 | B1 | * | 3/2001 | Voges | 128/200.14 |

FOREIGN PATENT DOCUMENTS

| | | | |
|---|---|---|---|
| AU | 70632/94 A1 | * | 1/1995 |
| WO | WO-95/01137 B1 | * | 1/1995 |

* cited by examiner

*Primary Examiner*—Darren W. Ark
(74) *Attorney, Agent, or Firm*—Locke Liddell & Sapp LLP

(57) ABSTRACT

A method and apparatus for dispensing pheromones, semiochemicals, and other materials that can control the behavior or physiology of insects and other pests are described. The dispensers (AgJets) use electronic dispensing technology such as that used in ink jet printing. The units have a self-containing reservoir for the to-be-dispensed chemical, and they are capable of being activated to dispense by an electromagnetic signal from a broadcasting controller unit. Picoliter volumes of pheromones and semiochemicals can be dispensed in drop-on-demand mode. The units for dispensing shall be powered by battery and/or solar energy for hands-off operation in remote sites. The units may also have weather monitoring devices (thermometer, anemometer, humidity measurement), and such climactic information can be transmitted to central receiving stations and/or used locally in the AgJet device to control chemical dispensing.

39 Claims, 8 Drawing Sheets

METHOD AND APPARATUS FOR DISPENSING AIRBORNE MATERIALS FOR CONTROLLING PESTS

CROSS REFERENCE TO RELATED APPLICATIONS

This is a continuation of pending continuation-in-part application Ser. No. 09/110,486 filed Jul. 6, 1998 now abandoned with the same title and inventors and claims priority from provisional application No. 60/051,900 filed on Jul. 8, 1997 for all of which priority is claimed under 35 U.S.C. Section 120 and Section 119(e).

The invention was made with government support under contract 98-33610-5977 awarded by the United States Department of Agriculture. The United States government may have certain rights in this invention.

BACKGROUND OF THE INVENTION

1. Field of the Invention

The invention discloses a method and apparatus for electronic distribution of small accurately metered amounts of materials which can control behavior of insects and pests for the benefit of mankind.

2. Background of Related Art

Pheromone dispensing is being widely studied as a means to control pests and has been used in orchards and other agricultural environments for this purpose. Control of pathogenic pests that attack crops, forests, people, pets, and livestock is a monumental universally important task. Blanket spraying of toxic pesticides has caused environmental damage, which is now just beginning to be halted or reversed because of dangers and unanticipated consequences. Biotechnology is being employed in emerging "green" methods of pathogen control with discrete, precisely timed and monitored application of substances for control. Continued precision targeting of natural chemicals or chemical which mimic natural chemicals will be the key to a minimally-disruptive pest control system. The ultimate version of this approach is the use of insect pheromones, of which a mere few hundred molecules can suffice to lure pathogenic organisms into traps or away from target crops. Disruption of mating can reduce or even eliminate the next generation of insect pests. Pheromones can also be used to lure predatory and beneficial insects into a field for crop protection. These non-toxic environmentally safe developments promise an exciting new era in crop protection.

Most of the common damaging insects, such as the codling moth, do their damage in the adult stage after mating. They penetrate developing fruit in large numbers to lay eggs which develop into larva which produce unsalable product at harvest time. Emergence of the adults is sometimes referred to as the biofix point which is usually based upon a certain number of degree days. The female moths emerge in different orchards, as many as four or five days apart. Females release pheromones which form a plume in wind that spreads and dilutes as it flows downstream. Females may harbor up to a picogram of pheromone when active, according to some researchers. Males have species-specific binding proteins which detect these pheromones and lead to mate seeking activity. It has been reported that males initiate upwind direct flight or "zig zag" flight in an attempt to reach the source of the sensory sensation. It is known that insect flight for mating occurs mainly in the dusk-to-dawn period and not during daylight hours. Cost effective control has been reported on a commercial scale despite the very high cost of pheromones which are sometimes referred to as semiochemicals. A discussion of semiochemicals and a specific delivery system is found in U.S. Pat. No. 5,645,844, incorporated herein by reference.

Presently, pheromones are dispensed by "dumb", generally "passive" systems that provide no control over timing or amount of pheromone dispensed. Typical dispensing systems are passive "wick" type devices or slowly evaporating mixtures of pheromones and matrix from which the pheromone is passively volatilized into the air at a relatively steady but decreasing state until depleted. Some examples of this approach include PVC/twine dispensers, novel sesquiterpene epoxides for embedding volatiles, cuticular waxes, polymeric laminated flakes (Hercon), polymer impregnated time-released dispensers, and others mentioned in the aforesaid patent reference. Some specific examples of commercial dispensing systems are known by the following names are: Sentry, Heliothis, IPS Unitrap, Multipher I, and Hartstack Wiretrap.

Such devices rely upon such processes as diffusion, breaking down of chemical bonds or degradation processes, with volatility as the only mechanism to control the amount or timing of pheromone releases. The rate at which these processes operate is usually temperature dependent. They speed up during the day when actually no usefulness is obtained with respect to night flying insects, and slow down at night when they are most needed. Once such devices are set out, there is no way to control or stop the dispersion of expensive chemicals. More pheromone is needed initially to account for natural decreases which occur as chemicals are depleted with time.

An intermittent spray of material has been proposed as described in U.S. Pat. No. 5,205,064. This device amounts to an aerosol can with an electrically operated cam which operates a lever to open a valve. Some have referred to such devices as an aerosol "puffer". The pressurized aerosol dispenser has a mechanically actuated push valve. Puffer devices are fairly large and also influenced by temperature. They require a propellant which may not be compatible with some pheromones. They are subject to clogging and canister failure problems. Puffer devices do enable the use of a timer to permit dispensing during the desired period and not dispensing during other periods. Droplet size control is nearly nonexistent with a wide variety of drop sizes produced. The output may vary as internal pressure in the canister drops during use. There is also a piezoelectric "buzzer" that is used to assist in the dispersement of the pheromone material into the air.

Substances to be dispensed will include pheromones, semiochemicals, and any other chemicals which have usefulness for the control of pest behavior. These materials can be synthesized from the constituent amino acids in the case of peptide pheromones and purchased from a relatively large number of commercial pheromone producers such as Ciba Geigy, Concep, Hercon and Ecogen for instance. There are three fundamental ways pheromones and related chemicals are typically used for pest control, although additional ways are not precluded.

One way pheromones are used is to lure pests to traps for simple killing or for trapping for subsequent counting. The puffer device shown in U.S. Pat. No. 5,205,064 employs an electrified grid which electrocutes the insects when they try to reach the source of attractant. Counting the number of a particular species of insect is important in determining the level of infestation as well as identifying the biofix time. The attract-and-kill method and the attract-trap-count technique both use pheromones the will attract an insect species. The most straight forward version of this approach is, for example, the use of a female insects sex lure to attract conspecific males for trapping, killing or counting. In this case, the pheromone would be naturally occurring scent materials either harvested from the females or synthesized as exact replicas of the naturally-occurring pheromone.

A second way pheromones can be used for crop protection is to dispense pheromones or seriochemicals that will lure predators to the field which naturally attack and kill pests for which control is sought.

A third approach for pest control through use of pheromones is called the "disruption" approach briefly mentioned above. Pheromones which will disrupt mating or maturation of the pest in the field are dispensed, thus stopping the production of pests that are attacking the crop. If a female sex lure causes all of the males to mate or seek to mate with the pheromone dispenser instead of mating with real females, the breeding cycle will be disrupted and real mating will not occur. In all of these cases, optimum control of these pests would be obtained by dispensing minute amounts (pico- or nano-liter volumes) of the controlling pheromone or semiochemical in an intermittent pattern that is optimally interactive with time of day, time of year and other climactic and environmental conditions.

SUMMARY OF THE INVENTION

The invention comprises an improved apparatus and method for controlled "jetting" of pheromones "on demand" at the highest useful concentration at precisely the times and places that will maximally disrupt mating. It is useful for improved efficiency and control in the other pest control methods as well. The invention is a "smart" system which will dispense pheromones in a discrete, micro-drop-by-micro-drop fashion, as required, under direct digital control. It is the application of controlled ink jet technology to dramatically increase effectiveness of these non-toxic pest control methods. Electronically actuated dispensers are provided having an ejection device with an orifice in fluid communication with a fluid reservoir containing a pest specific volatile fluid in the reservoir. A unique coiled tube reservoir is disclosed.

The fluid is selected to predictably alter the physiology or behavior of pests.

Although the main use of this invention is expected to be the attraction or modification of behavior of insects that are detrimental to plants, it should be understood that the pheromone distribution system and apparatus could be used to attract beneficial insects such as pollinators or even to attract predators of insects which are harmful to plants. The term "pests" as used herein, should be construed with these additional connotations in mind.

The electronically actuated ejection device is selected from the group consisting of piezoelectric, magnetorestrictive, inductive, thermal and fast solenoid valve dispensing devices. The dispensing devices are configured to eject a series of uniform individual micro-droplets within a range of diameters between about 2 to about 500 microns. These may be referred to herein as Agjets. Agjets in the preferred embodiment employ solid state piezoelectric dispensing jets. The Agjet dispensers can dispense individual droplets of pheromone as small as 20 trillionths of a liter in size. Agjets can dispense 20 picoliter (pl) or larger droplets at rates from 1 to 5,000 drops per second, for precise controlled dispensing. Requiring only trivial amounts of power to dispense, Agjets can be battery- or solar-powered and triggered by remote radio-control.

Agjet control systems can generate any arbitrary pattern of pheromone delivery that would be optimum for control of pests. Moreover, by broadcasting weather conditions and other data to a central control station, Agjets equipped with sensors and transceivers can inform central processing systems when the optimum conditions for dispensing can or cannot be obtained. A control unit is used to actuate the dispenser during a selected time interval or intervals to produce successive individual micro-droplets of a selected uniform size within a desired range of droplet sizes. The Agjet dispenser is operated through the control unit. Droplets of a selected uniform size within the desired range of diameters are ejected from the orifice at a rate sufficient to release a desired amount of the volatile material from the reservoir over a selected time interval at a uniform rate in order to control pests. Although Agjet dispensers may deposit the ejected micro-droplets onto a wick for more efficient volatilization, it is the digital control of the device which is important.

The Agjet dispensing apparatus is comprised of one or more of the following components: (a) one or a plurality of reservoirs to hold pheromones or other behavior-modifying chemicals in volumes ranting from 1 ul to 100 ml. (b) chemical additives including but not limited to antioxidants that extend the life-span of stored pheromones or other chemicals in the reservoirs (c) one or a plurality of fluid conduits providing a means to convey fluids from said reservoirs to one or a plurality of dispensing devices (d) one or a plurality of electronically-actuated dispensing devices providing a means to dispense into the air drops of fluid ranging in size from 2 um to 500 um in diameter (e) a controlling electronic circuit providing a means to dispense one or more drops from one or more of the dispensing devices at rates from 0 to 4,000 drops per second (f) a means to convey or store electronic charge for the purpose of powering the electronic control circuit (g) an electromagnetic signal receiver providing a means for electromagnetic signals (e.g., laser, radio, microwave) to control the dispensing of drops (h) solar-cells for charging batteries or directly driving the electronic circuitry (i) apparatus providing a means to measure variables such as wind speed, wind direction, humidity, ambient temperature, ambient light, (j) an apparatus providing the means to broadcast the data mentioned in "i" to receiving equipment by any of the mechanisms described in "g". Agjet dispensers can be dispersed within a field or greenhouse with or without environmental condition sensors and hard wired into a programmed controller or equipped with what may be referred to as "transceivers" which operate on an electromagnetic frequency signal sent to or received from a remote programmed controller in a central processing system. Orchards, vineyards and greenhouses are well suited for a permanent or semi-permanent installation of dispersed pheromone dispensers. In row crops, dispensers mounted on stakes are installed after planting and removed before harvest.

An interactive real time system of dispersed dispensers is equipped with electromagnetically-activated receivers and driving circuits which operate the dispensers. A remote electromagnetic transceiver and programmed digital computing device connected to the transceiver comprises a remote control unit. One or more environmental monitoring stations which communicates with a transceiver is capable of monitoring an environmental condition parameter and transmitting a signal representative of the condition to the remote control unit or even to individual Agjet dispensers that are equipped with receivers and appropriate control circuits. For example, sensing of excessive wind speed during a timed dispensing cycle could result in a signal being sent to the individual Agjet dispensers to cease dispensing. At some intermediate wind speed, a signal could be sent to increase the amount of pheromone material dispensed by increasing the frequency of electrical pulses being delivered to the dispensing unit. The preferred system uses a master control station which communicates with the environmental station and then the master control station sends signals to control the individual dispensers.

Compared to passive "wick" style pheromone delivery systems, radio-controlled Agjets can provide the following advantages: (a) optimizing timing of pheromone releases to accomplish the desired pest control objective with smaller amounts of expensive pheromone; (b) the inventive dispensers dispense from a sealed reservoir which allows long term operation (a year or more) without the need for replenishing the pheromone; (c) precise control of drop size and rate of drop production permits precisely controlled dispensing which saves expensive pheromones and allows instantaneous adjustment of the amount of pheromone dispensed or cessation of dispensing in response to the condition of environmental parameters; (d) a control system, such as radio-control, which permits interactive dispensing with respect to season, crop status, weather (wind speed and direction, humidity, temperature), presence of pests or predators, etc. and (e) interactive dispensing through use of a control system allows geographically-staggered units to be activated in sequence, thus "leading" insects in a desired direction.

In addition to these advantages as compared to existing "puffer" technology employing mechanical activation of pressurized aerosol spray cans, the ink-jet style miniature dispensers referred to as Agjets offer advantages in the following respects: (a) there are no pressurized containers to maintain or replace; (b) the Agjet package even including a transceiver is a much smaller package for storing, dispensing and controlling dispensing as compared to aerosol spray can systems which is on the order of 1/20th the overall size of the package; (c) electronically controlled individual dispensers, such as piezoelectric dispensers, operate in response to an electrical pulse which does not have the reliability problem of mechanical actuators; (d) there are no environmentally-threatening propellants necessary or problems associated with compatibility between propellants and sensitive pheromones; (e) although the preferred piezoelectric dispensers move slightly with each electrical pulse to disperse individual droplets, the movement is a bulk material movement and does not involve any mechanical moving parts.

DETAILED DESCRIPTION OF THE PREFERRED EMBODIMENT

The invention applies technology used in the ink-jet printing industry and control systems for electronic dispensing of pheromones, semiochemicals and other fluids the purpose of modifying the activity or behavior of insect, viral or bacterial pests for pest control in large areas. The ink-jet printing dispensing methods could include dispensing by piezoelectric methods, thermal methods, magnetorestrictive methods or inductive methods. Digital control of the dispensers permits turning them off or on, adjusting their output or operating them in a pattern in response to signals transmitted by wire or wireless devices.

Figure 1:
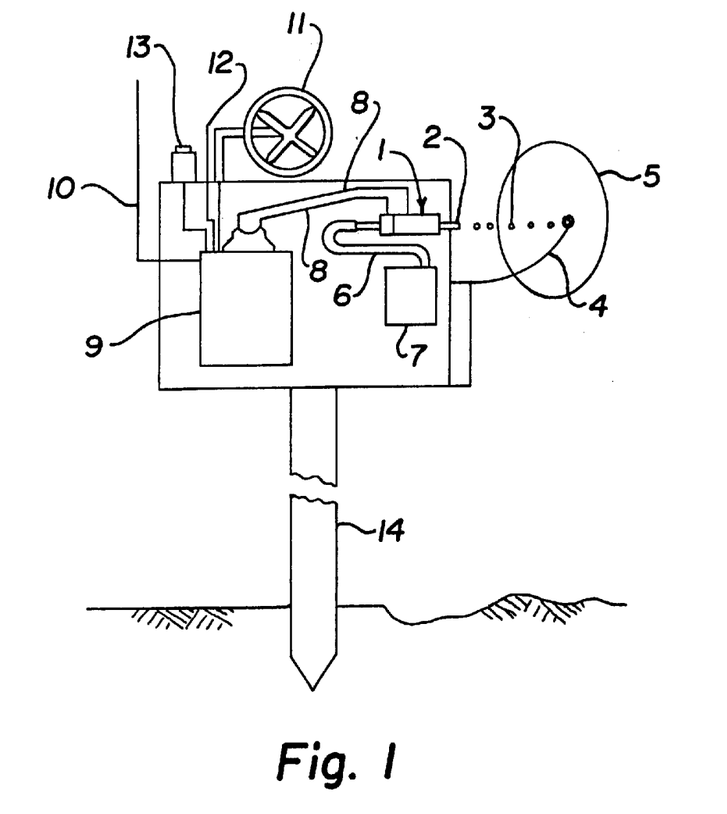
FIG. 1 is a side view with the side cover removed of a dispensing device equipped with a piezoelectric ejection device schematically shown with a self-contained power source and equipped with radio-type receiver antenna and control circuitry for converting radio signals into pulses which operate the ejection device and schematically indicated sensors which can interact with a control system to operate the device.

FIG. 1 illustrates the dispenser using the piezoelectric method pheromones or other volatile fluids for pest control. In FIG. 1, a schematic dispenser has a preferred piezoelectric ejection device 1 located in a case mounted on a stake support 14 suitable for driving into the soil. Drops 3 are ejected from glass center tube 2. Electrical leads 8 for delivering operating pulses to dispensing device 1 are operably connected to an electronic dispenser control system 9 which has an internal battery power supply and drive electronics for generating pulses for controlling operation of jetting or ejection device 1. Included in FIG. 1 is a radio-type radio antenna 10 which extends from a radio receiver or transceiver operably connected to circuitry in control unit 9. Control unit 9 includes a digital computing device and a means for converting signals received by the receiver or transceiver into operating commands. In this context, the term receiver refers to a radio control device that receives and converts signals from a remote source in one-way communication. The term transceiver connotes a radio device that receives and converts signals which can be used by the control system to operate the ejection device and is capable of transmitting information to a remote station in two-way communication. The communication systems themselves are conventional. The preferred communication system is offered by Motorola Inc.'s FLEX™ Architecture Solutions Division, Boynton Beach, Fla. 33426-8622. CreataLink™ (one-way) and CreataLink2™ (two-way) receiver/transceivers use Motorola's FLEX™ paging protocols including FLEX™ one-way, ReFlex™ two-way and InFLEXion™ voice transmission technologies. Motorola offers a robust product portfolio of pagers, components, infrastructure, test equipment, application protocols and software which are believed to be well suited to use to handle communications within this invention.

Piezoelectric dispensing device 1 has a glass center tube 2 that lies concentrically within a piezoelectric tube. The fluid to be dispensed is contained in a small "sealed" reservoir 7 which is connected by means of a fluid conduit 6. As is conventional, the reservoir is not usually absolutely sealed, but contains a vent or valve in fluid communication with the reservoir through a tortuous path so that atmospheric pressure can be maintained on the fluid to prevent vacuum blockage from occurring. Therefore the term "sealed reservoir" is understood to include a vent. Tube 2 may comprise a channel made of piezoelectric material or is overlaid on one or more side by piezoelectric material. Flexion of the piezoelectric material produced by introducing a voltage against the piezoelectric material compresses the fluid-containing compartment within tube 2. The result is that a drop of fluid is ejected from the fluid-containing compartment through a precisely machined orifice which is typically about 60 $\mu$m in diameter or less as illustrated by microdrops 3 of fluid which are deposited onto a permeable wick 4 from which a vapor cloud 5 of pheromone or other insect behavior-controlling substance emanates. Repeated droplet production maintains the cloud which plumes away downwind for a considerable effective distance. Also schematically illustrated are climate-monitoring devices connected to control unit 9 including wind speed monitoring device 11, temperature monitoring device 12, and humidity monitoring device 13. Alternately, the environmental monitoring devices could be included in a separate environmental control station shown in FIGS. 3 and 4.

FIG. 2 is a schematic top view showing some of the components of the dispenser of FIG. 1 without the environmental sensors 11, 12, 13 or the antenna 10. A round case is illustrated. A complete unit can be made which is not appreciably larger than a Motorola pocket pager.

FIG. 2*a* schematically illustrates the use of a shutter 31 which moves to the dotted position 31 "prime" in response to an actuator 29 operated by electrical connections 27 and a control unit 9. A shutter schematically illustrated in FIG. 2*a* or a variation thereon is preferably used to close the orifice 2 to protect it from dust, dirt or any other foreign objects when dispensing is not underway. The shutter is open before dispensing begins and closed after dispensing ends.

FIG. 3 shows a pheromone dispensing device 15, for example from FIG. 1, representative of a plurality of such devices. In one embodiment, dispensing unit 15 receives dispense commands via a communication satellite 16 which in turn receives climatic data representing one or more environmental parameters from an environmental sensing Agjet station 17. Satellite 16 is also in two way communication with a central computing/control station 18 that has received via satellite 16 the data on local climatic conditions from environmental sensing station 17 as well as data from other sources which control station 18 may have in its data bank. Control station 18 is a master control station which processes the data received from environmental sensing station 17 and transmits back to the dispensing units 15, signals that control pheromone dispensing by dispensers 15.

FIG. 4 illustrates a plurality of AgJet dispensing units 15 dispensed throughout many acres of a cultivated field in which climatic sensing station 17 has been placed. Climatic data sensed by station 17 is relayed by communications satellite 16 to the main control station 18 from which commands are issued back via satellite 16 to control the pheromone dispensing units. Dispensing unit commands are generated at main control station 18 by central control/computing computers that utilize insect-control software, information from other fields (like FIG. 4) and other/historical data, to generate optimum pheromone dispensing programs.

Climate-sensing equipment in the Agjet system can be incorporated into one or several "master" dispensing units 15, in a communication loop with many non-sensing dispensers. In effect, these "master" dispensing units can substitute for a separate environmental sensing station. Temperature can be monitored by thermistor, humidity by a hygroscopic crystal that changes electrical resistance with ambient humidity, wind speed by a strain-gauge type instrument which changes electrical resistance when deflected by the wind, and wind direction by a series of wind-speed monitors mounted in slits oriented to the compass points. The broadcast of this information from the Agjet system to the receiving station can be by conventional communication links as used in cellular telephones, two-way radios, and so forth. One skilled in the art could find many other devices capable of measuring and generating a signal representative of these parameters.

In an alternate embodiment schematically illustrated in FIGS. 10A–C, the pheromone dispensing system differs in that commands are generated and sent via wire or radio frequency or equivalent signals without the use of the satellite.

The wireless control system contemplated is used in commonly known pagers utilizing paging technology mentioned above developed by Motorola and other companies. U.S. Pat. Nos. 5,053,100, 5,092,864, 5,193,738, 5,435,060, 5,208,980, 5,235,352, 5,227,813 and 5,433,809 show some of the details of design and manufacturing of such a piezoelectric fluid pumping device and are incorporated herein by reference. Further information about the design and manufacture of piezoelectric fluid dispensing devices can be found in the following publications: ("Application of Ink-Jet Technology to Dispensing in the Electronics an Semiconductor Industries", D. B. Wallace and D. J. Hayes, presented at the ISHM 1987 Microelectronics Interconnect Conference, August 1987. "Application of Ink-Jet Technology to Adhesive Dispensing", D. B. Wallace and D. J. Hayes, presented at the SME Adhesive '87 Conference, September 1987. "Overview of Small Holes," D. J. Hayes and D. B. Wallace, invited paper, SME Nontraditional Machining Conference, November 1989. "Hot Bar Thermoelectric Analysis," presented at the 2nd ISHM Joint Technology Conference, April 1991. "Study of Orifice Fabrication Technologies for the Liquid Droplet Radiator," D. B. Wallace, D. J. Hayes and J. M. Bush, NASA Contractor Report 187114, May 1991. "Biomedical Applications of Piezoelectric Fluid Dispensing Jets," C. J. Frederickson, D. B. Wallace, R. Cox, and D. J. Hayes, Abstracts of the Tenth Annual Conference on Biomedical Engineering Research in Houston, 1992. "Picoliter Solder Droplet Dispensing," D. J. Hayes, D. B. Wallace, and M. T. Boldman, *Proceedings, ISHM '92*, October 1992.)

The piezoelectric-type electronic dispenser has an electronic drive system that controls the dispenser with a circuit that generates a brief (20–100 microsecond) monophasic pulse of 2–20 volts, with a rise time of 1–10 microseconds and a fall time of 1–10 microseconds. Once such pulse (amplified to 20–30 volts) is delivered to a piezoelectric bending or squeezing element it generates a brief pressure transient sufficient to eject one drop in the picoliter volume range from a piezoelectric drop dispenser ejector jet. More details are given in the papers cited above and in U.S. Pat. No. 5,436,648 incorporated herein by reference. Drive circuitry of this sort can be designed or controlled to produce trains of pulses up to 4,000 per second, which in turn will produce discreet drops of fluid of rates up to 4,000 drops per second.

One skilled in the art would understand that the number of molecules of the pheromone or other volatile fluids for pest control dispensed into the air could be obtained with different setting of various variables. These could include: concentration of pheromones or other volatile fluids for pest control in the droplets; droplet size; droplet rate; number of orifices used for jetting; and evaporation rate; etc.

Optimizing these variables requires experimentation for short bursts at very high frequencies (i.e. 25 Khz) followed by quiet times may prove to be similar to long bursts at lower frequencies (i.e. 2.5 Khz). Smaller droplets at high frequencies may be similar to larger drops at lower frequencies. Smaller drops of concentrated fluids may be similar to larger droplets of dilute fluids. Multiple orifices at lower frequencies may be similar to single orifices at high frequencies.

The energy used to power the electronic drive circuitry described above can come from a battery, from a solar-charged battery, or from the electronic main supply in indoor installations. The orifice from which the drops emanate from tube 2 of ejection device or jetting device 1 is extremely small and may be located at a surface provided with a movable shutter (not shown) also connected to control unit 9 wherein the shutter is operated by another piezoelectric actuator. The motion required to move a shutter over the orifice to protect it from dust, moisture or debris may be provided by a piezoelectric Bimorph® actuator that may be obtained from Morgan Matroc Inc., Electro Ceramics Division, 232 Forbes Road, Bedford, Ohio 44146. These devices are discussed in a "Guide to Modern Piezoelectric Ceramics" by Morgan Matroc.

Figure 2:
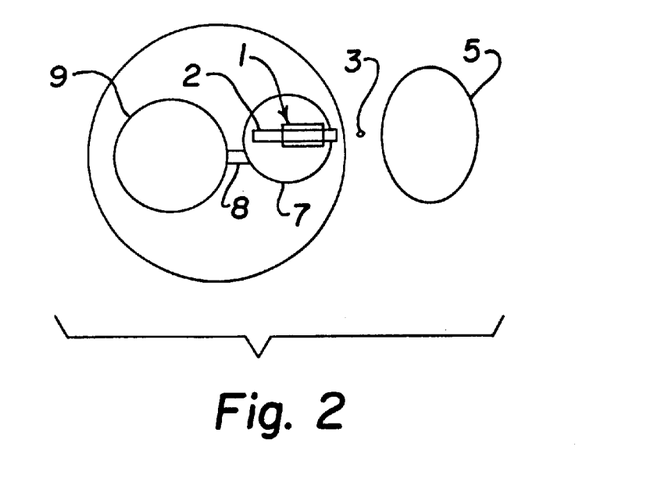
FIG. 2 is a schematic top view of the dispenser of FIG. 1 with the top cover of the unit removed.
Figure 2A:
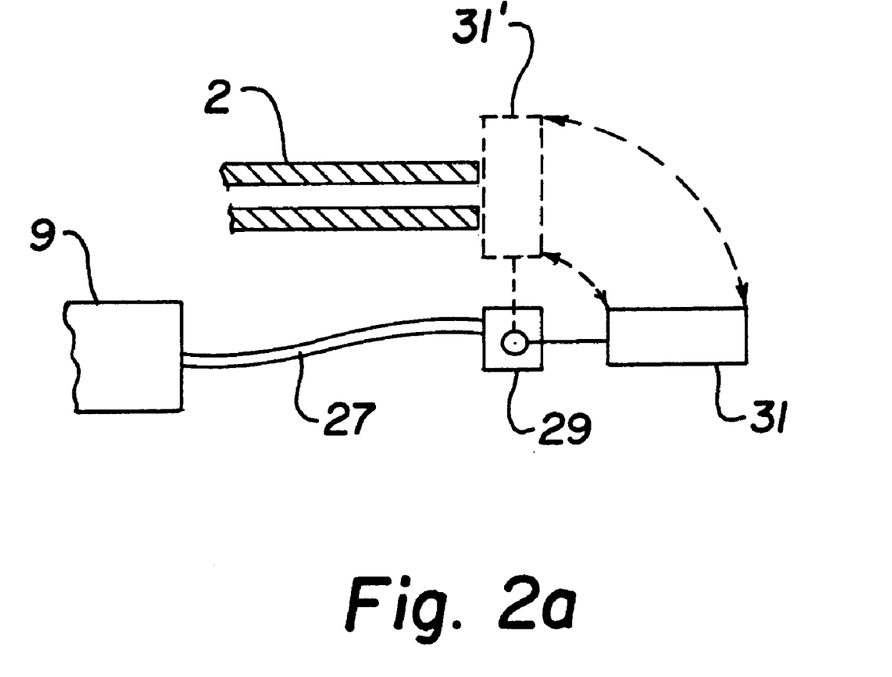
FIG. 2a schematically illustrates a shutter used to cover and uncover the orifice.
Figure 3:
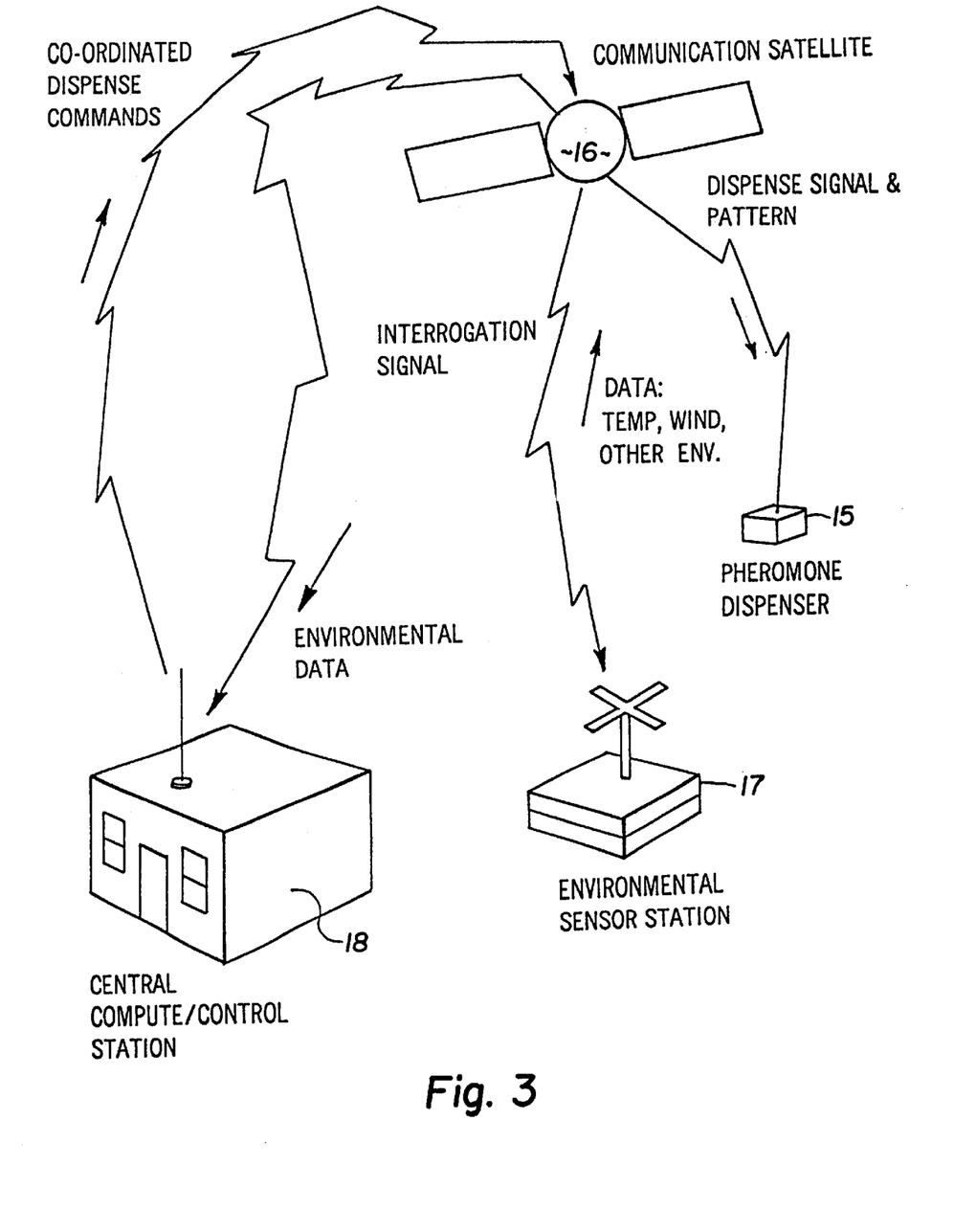
FIG. 3 is a schematic arrangement of a system for controlling pests which includes a central computing station, an environmental sensing station and a pheromone dispenser representing a plurality of pheromone dispensers interacting via a communication satellite.
Figure 4:
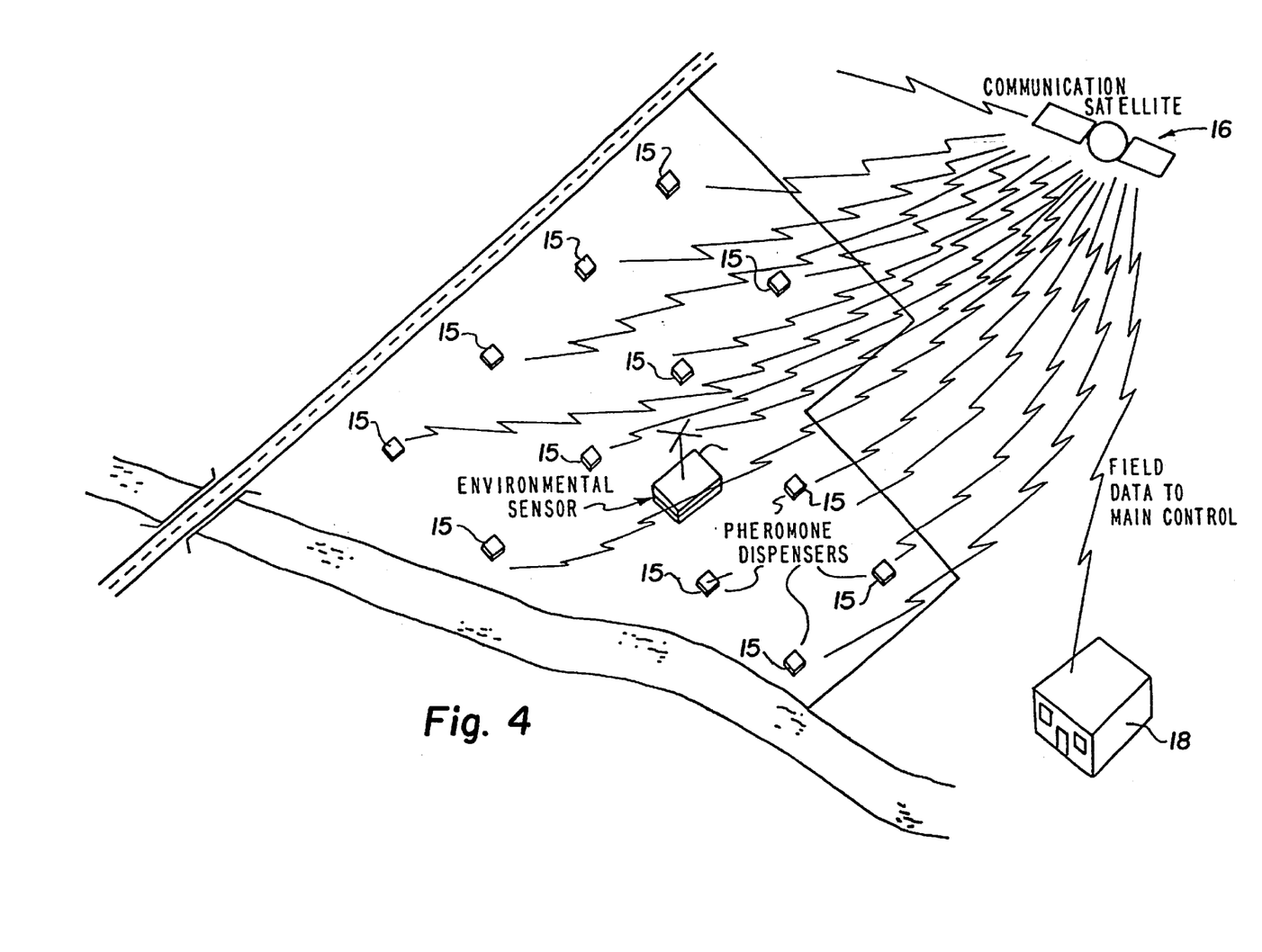
FIG. 4 is another schematic illustration of a pest control system wherein the plurality of pheromone dispensers are distributed in a remote field containing an environmental sensing station which communicates through a communication satellite with a main central control and computing station that utilizes insect-control software and information from other fields as well as historical data to generate optimum pheromone dispensing programs through radio signals delivered to individual dispensers via satellite.

The shutter actuator operates in an on/off mode to uncover the orifice when jetting of fluid from reservoir 7 is to be initiated and cover the orifice again when jetting is stopped.

Figure 10A:
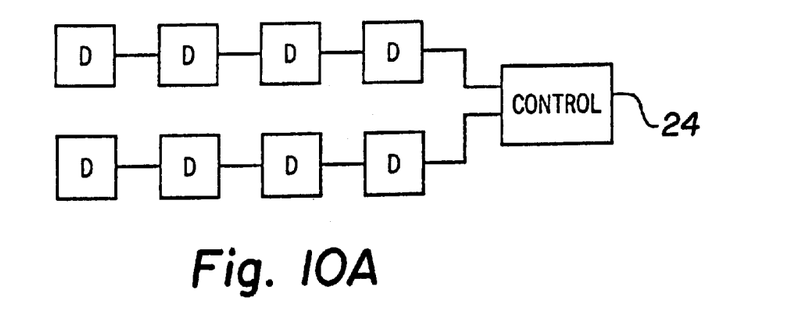
FIG. 10A is a schematic arrangement for a simple wired dispenser arrangement which may be controlled by a simple switch or timing device.
Figure 10B:
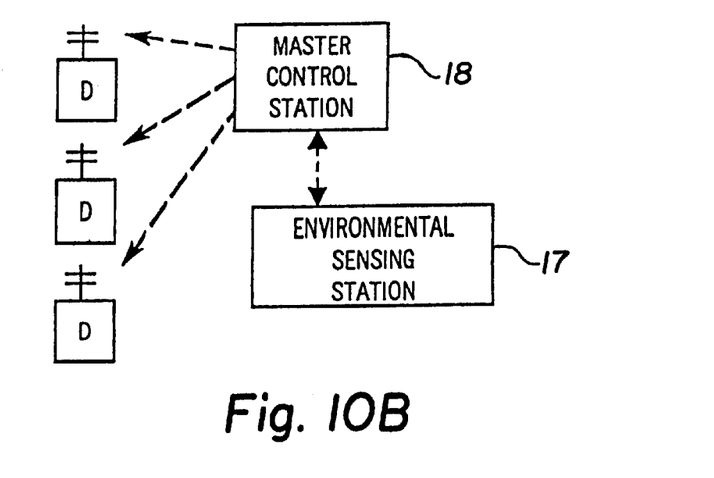
FIG. 10B is a schematic arrangement for a wireless system illustrating one way communication between a master control station and dispensers equipped with receivers.
Figure 10C:
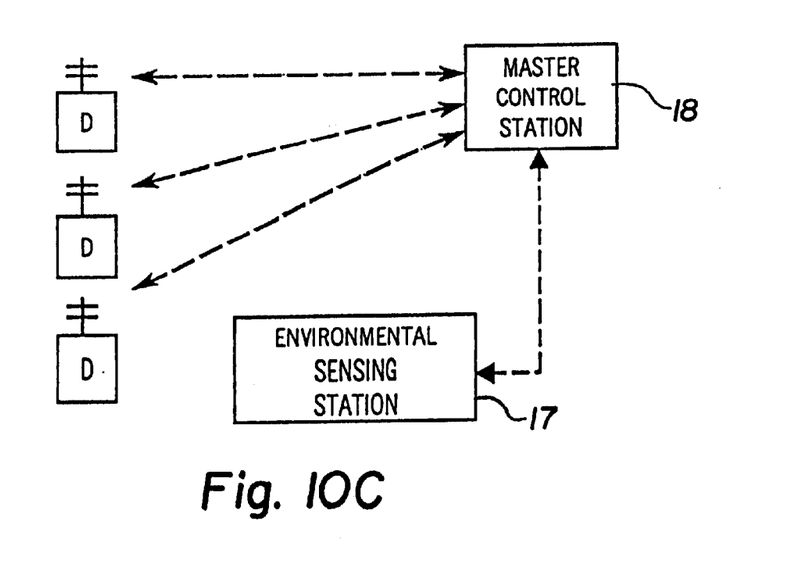
FIG. 10C is a schematic arrangement for a wireless system illustrating two way communication between the master control station of FIG. 10B and dispensers equipped with transceivers for two way radio frequency communication using paging technology.

Perhaps the simplest use of pheromone dispensers of the invention is in the wired system of FIG. 10A where a plurality of dispensers each having an ejection device or devices and drive electronics are dispersed over an area to be protected and wired to a remote control unit which comprises a programmable controller with a suitable power source and operating circuitry connected into the wired system. The programmable controller could be as simple as a timer that generates operating signals which are transmitted through the wires to each dispenser to turn the dispensers on at night and turn them off again during the day. FIG. 10A represents a simple wired system where the individual dispensers and wiring system can be permanently or semi-permanently installed which may be suitable for a greenhouse or vineyard, for example. Pheromone dispensers 15 represented by "D" are hard wired to a control station 24 which could be a switch and a timer to turn dispensers D on or off. FIGS. 10B and 10C represent a more complex system in which dispensers "D" are operated respectively in one way or two way wireless communication from master control station 18 which is in two way wireless communication with environmental sensing station 17. The operating signals could provide intervals of on and off dispensing periods during an operating cycle.

Control of the electronic drive system can be via a radio-receiver that operates in the same general fashion as a radio-controlled model plane or car. A separate sending station will generate an amplitude or frequency-modulated radio signal with carrier frequency corresponding to the frequency to which the receiver is tuned. In its simplest format, the radio transmission will include a series of digital pulses, each one of which would cause the electronic (typically ink-jet-like) fluid dispenser to eject one drop of fluid. In more complex forms, the Agjet system could contain digital programmable circuitry which could be reprogrammed or initialized by transmitted messages from the sending station. For example, the sending station could send a message to begin operating the dispensers which are pre-programmed to dispense at a selected operating rate and send a second message to discontinue dispensing when the desired dispensing time has elapsed. Operation of the pheromone dispensers can be dependent upon one or a plurality of environmental condition parameters. Dispensing may be futile if wind is still or wind velocity is too high. Still wind does not allow a "plume" of pheromone vapor to trail out over the orchard to reach emerging insects. High wind simply blows the plumes away and dispenses them in the air. Target insects may be inactive unless the temperature is above a certain temperature or the humidity is too high (raining, for example). If a wind is blowing from one side of the field, the sending station could, for example, send signals to trigger operation of the dispensers on the windward side and not operate the last row or last several rows of dispensers on the downwind side, in order to economize on the use of expensive pheromones.

Figures 5, 7, 8, 9:
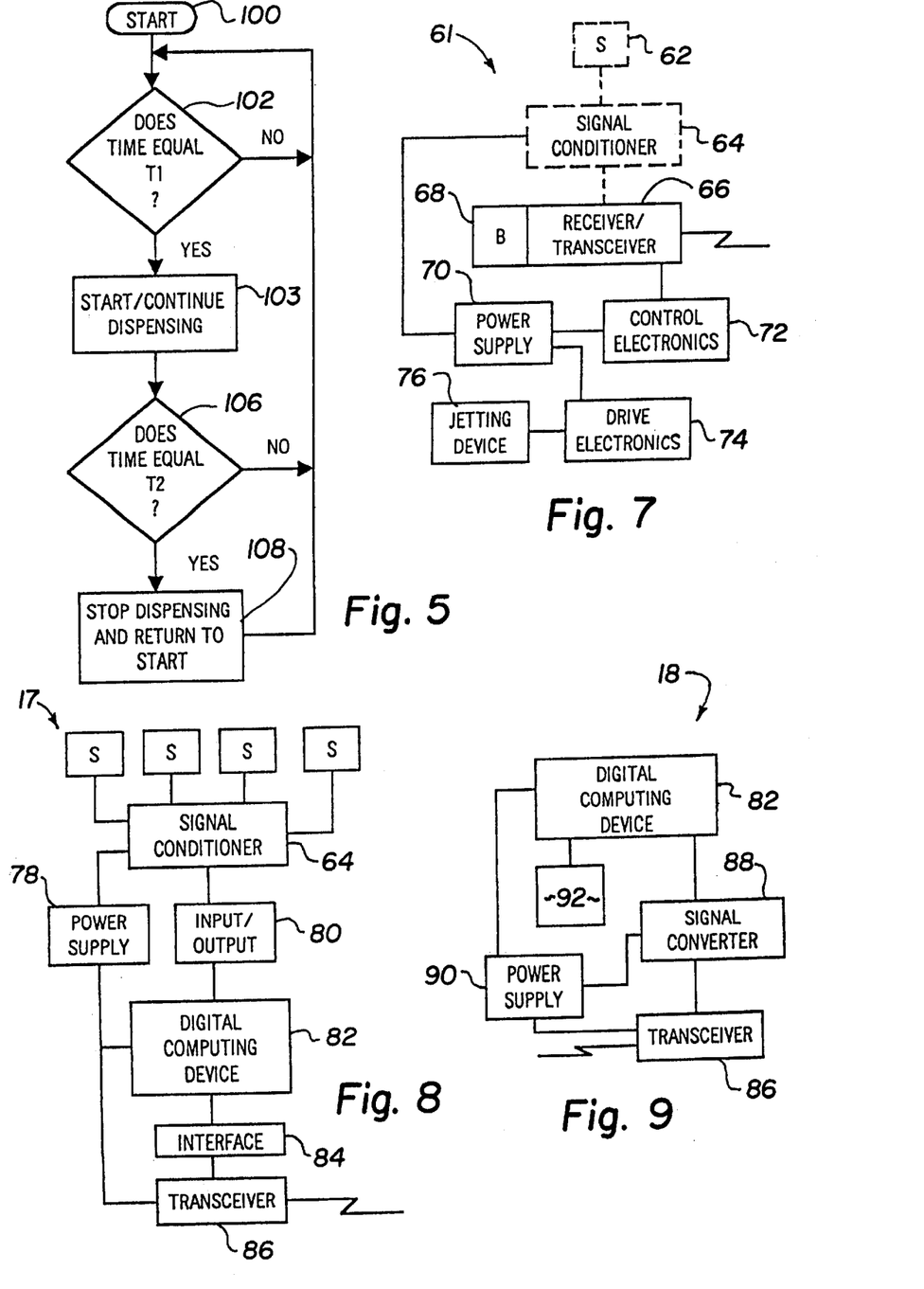
FIG. 5 is a high level flow chart which illustrates the controlled process of a simple system based upon time.
FIG. 7 is a schematic block diagram showing preferred components of an "Agjet" dispenser which includes in dotted outline, a sensor and sensor signal conditioner which could be added to monitor and communicate the condition of an environmental parameter.
FIG. 8 is a schematic block diagram showing preferred components of a station for monitoring and transmitting the condition or status of environmental parameters.
FIG. 9 is a schematic block diagram showing preferred components for a master control station which will be understood to include any necessary input/output interfaces for the computing devices.

FIG. 5 is an exemplary simple process which utilizes the fact that many pests do their mating in the period from dawn to dusk but not during the daytime. From start block 100, the system moves to block 102. Block 102 determines if start time T1 has arrived. If start time T1 has arrived, a dispensing command is generated at block 103 and communicated to a plurality of dispensers and the process moves to block 106 and recycles until the stop time T2 has arrived. When stop time T2 has arrived, the process generates and communicates to the dispensers a stop dispensing command at the block 108 and returns to start block 100.

Figure 6:
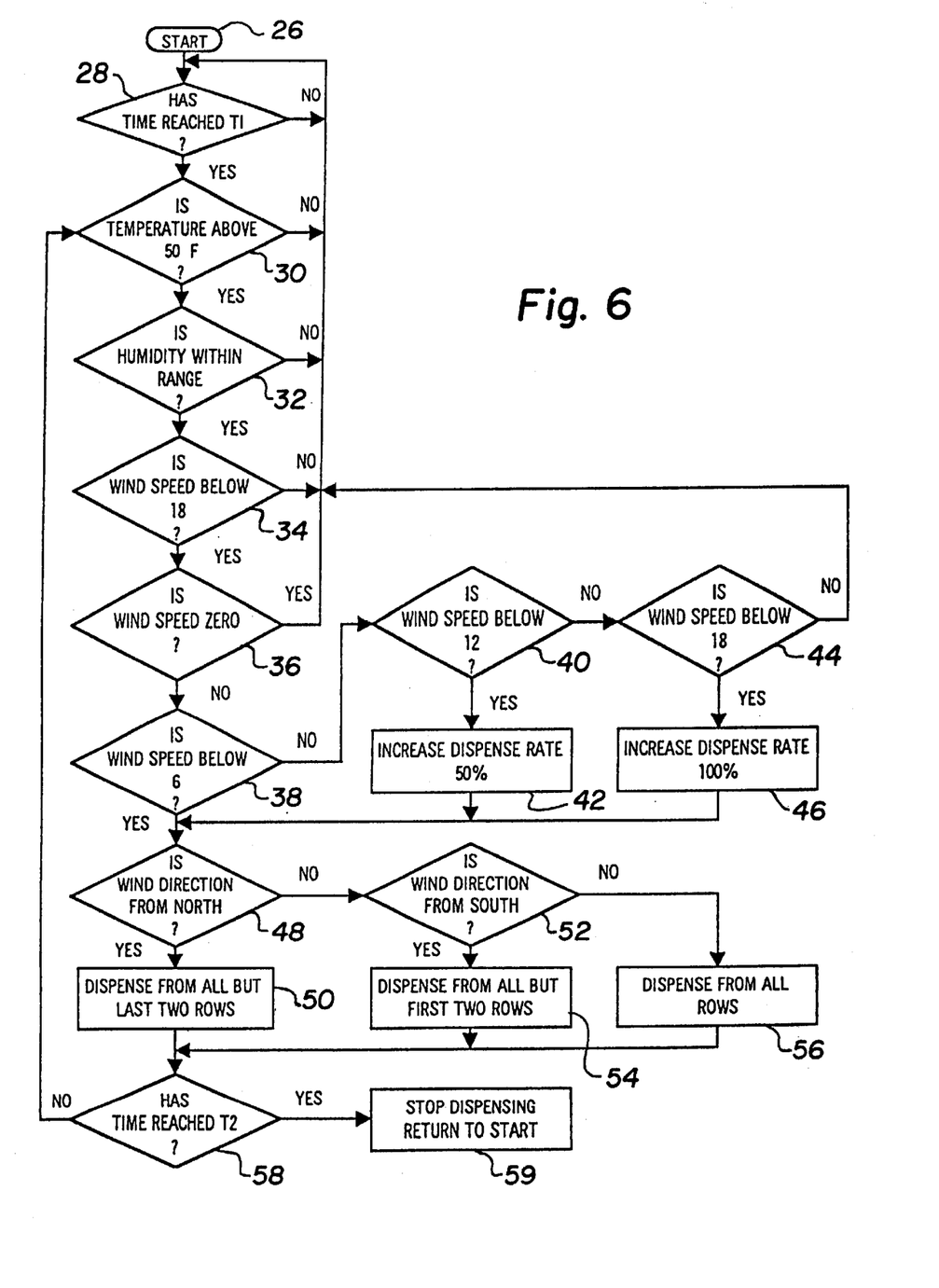
FIG. 6 is a high level flow chart which illustrates a more complex process which includes changes in the dispensing of fluid from the dispensers on the basis of measured environmental parameters, in addition to time.

FIG. 6 is an exemplary process which illustrates how signals from environmental sensing/monitoring station 17 can be utilized to control operation of a plurality of dispensers 15 in the system of FIGS. 3, 4 and 10B–C. It is understood that the absolute values of temperature, wind speed and wind direction are arbitrarily set in FIG. 6 for illustration purposes. In actuality, these values would be determined by experimentation in relation to a specific one of the many pests. Different pests may become active or inactive at different temperatures. The kind and amount of pheromone needed to be an effective amount may be greater for one pest than another. FIG. 6 contemplates a system with operating environmental sensors as in FIG. 1, or as is more likely for cost efficiency, in a system with an environmental sensing station 17 and a remote master/main control unit 18.

From start block 26 the system proceeds to block 28. Block 28 determines if time has reached start time T1. When time is T1, the system moves to block 30. At block 30 station 17, for example, checks a temperature sensor at the field where the dispensers are located. If the temperature is at or above a pre-selected limit, the process moves to block 32. At block 32 a humidity sensor at the dispensing area is checked to determine if humidity is within a pre-defined desired range. If humidity is within a desired range, the process moves to block 34. At block 34 a wind speed sensor in the dispensing area is checked to determine if wind speed is below a maximum desired velocity. If wind speed is below the maximum desired velocity, the process moves to block 36. At block 36, the wind speed sensor is checked to determine if the wind speed is near zero (still). If wind speed is not zero, the process moves to block 38. At block 38 the wind speed sensor in the dispensing area is checked to determine if the wind speed is below a first control velocity, in this case 6 miles per hour. If wind speed is below the first control velocity, the process continues to block 48. If wind speed is not below the first control velocity, the process moves to block 40. At block 40 the wind speed sensor is checked to determine if wind speed in the dispensing area is below a second control velocity, in this case 12 miles per hour. If wind speed is below 12 miles per hour, a signal is sent to adjust the dispensers to increase the dispense rate at block 42 and the process moves to block 48. (The signal to increase the dispense rate may simply be stored to be sent if and when a dispensing command is generated at main control 18.) If wind speed is not below the second control velocity, the process moves to block 44. At block 44 the wind speed sensor is checked to determine if wind speed is below a third control velocity, in this case 18 miles per hour. If wind speed exceeds 18 miles per hour, the process returns to start block 26. If not, the process moves to block 46 and a command to increase the dispense rate is either sent to set the dispensing units or stored to be sent later if and when a dispensing command is issued, and the process moves to block 48. At block 48, the environmental station 17 checks a wind direction sensor at the dispensing area and reports to the main control unit 18. If the wind direction is from the "north", the process moves to block 50. At block 50, a dispensing command is generated from the main control unit 18 and sent to the dispensers to dispense from all but the last two rows, for example. If the wind is not from the "north" the process moves to block 52. At block 52, the environmental station 17 checks the wind direction sensor at the dispensing area and reports to the main control unit 18. If the wind direction is from the "south", the process moves to block 54. At block 54 a dispensing command is generated and sent from control unit 18 to the dispensers to dispense from all but the first two rows, for example. If the wind is not from the "south" the process moves to block 56. At block 56 a dispensing command is generated and sent from the control unit 18 to the dispensers to dispense from all rows.

Next the process moves to block 58 to determine if the stop dispensing time T2 has arrived. If the stop dispensing time T2 has arrived, a stop dispensing command is generated at block 59 and sent by the control unit to the dispensers and the process returns to the start block. If block 58 determines time T2 has not arrived, the process returns to block 30 and replicates the previous steps from that point. It is evident that wait blocks could be added before environmental parameters are rechecked or the process could simply wait until T2 arrives or it could re-enter the string of steps at any point below block 28 to replicate only part of the process. For example, after block 58 the process could move to a wind speed block 34 or 36 instead of block 30, if desired.

FIG. 7 is a schematic block diagram to illustrate components of an "Agjet" pheromone dispenser 61. A generic environmental parameter sensor 62 denoted "S" is shown in dotted outline with a companion signal conditioner 64 in electrical communication with a receiver or transceiver 66 for one-way or two-way communication as desired. A receiver is useful for receiving operating commands from a remote control station for a dispensing unit without the dotted outline components. A transceiver is useful for a "master" dispensing unit with environmental parameter sensors to provide feedback in the case of a limited number of such "master" dispensers scattered among dispensers without sensing equipment. The master dispenser can operate the other dispensers. The receiver or transceiver may have its own power supply 68 denominated battery/solar powered battery "B". Dispenser 61 further includes power supply 70, control electronics 72 in electrical communication with receiver 66 and drive electronics 74 itself in electrical communication with pheromone jetting device 76. Pheromone jetting device 76 is preferably the piezoelectric ejection device 1 of FIG. 1.

FIG. 8 is a schematic block diagram of environmental sensing station 17. It has a plurality of environmental parameter sensors "S", in electrical communication with signal conditioner 64. Power supply 78 is in electrical communication with input/output device 80, digital computing device 82, interface 84 and transceiver 86. Each of these devices is in electrical communication so that signals representative of the status or condition of an environmental parameter can be converted and transmitted from environmental sensing station 17 to a master or main control station 18 in FIG. 9.

FIG. 9 is a schematic block diagram showing preferred components of master control station 18. Station 18 includes a digital computing device in electrical communication through a signal convertor 88 with its own transceiver 86, all in electrical communication with a power supply 90. Power supply 90 could be battery driven or connected to a power line depending on the location of station 18, which may be remote from a field or fields containing dispensers 61 which it is intended to operate. Computing device may include database 92 and a program which can be used to generate a likely emergence date for a target pest and used to trigger a series of dispensing cycles.

Figure 11:
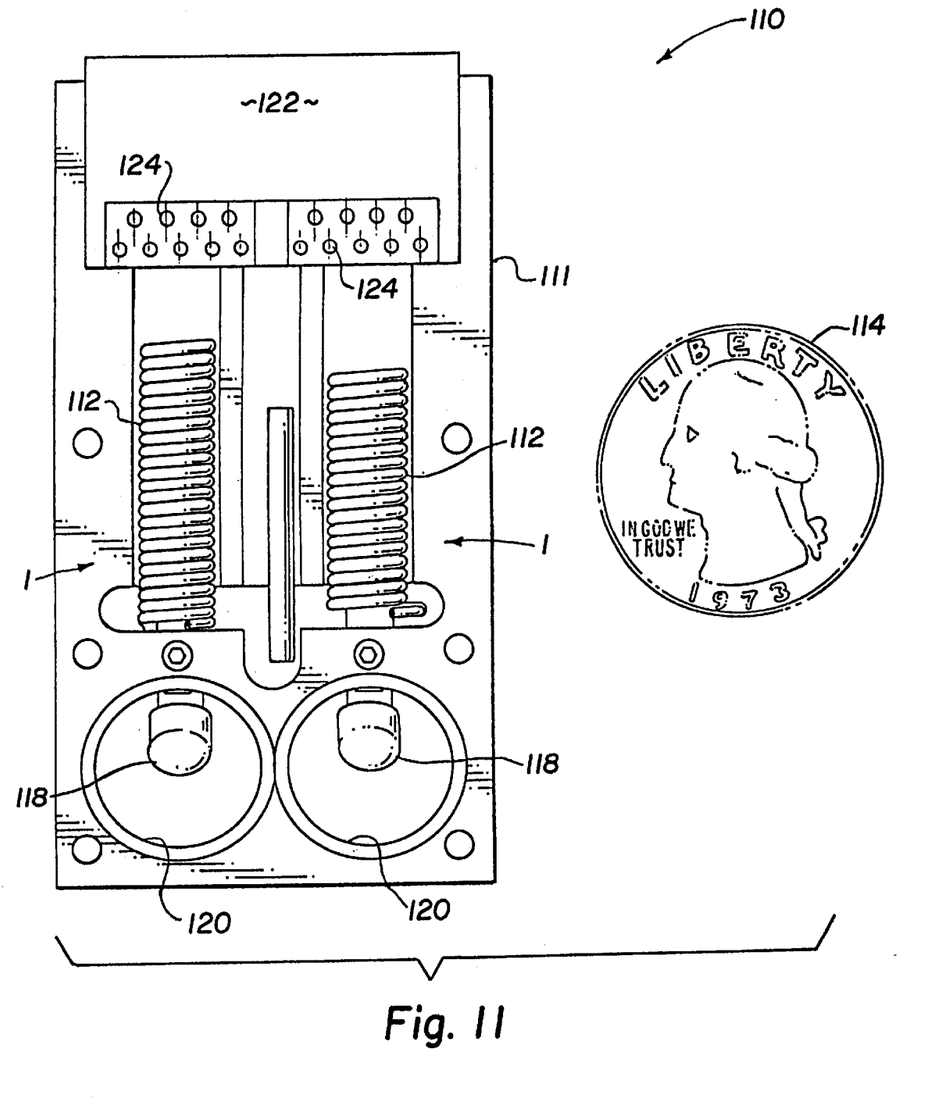
FIG. 11 is a schematic drawing of an actual prototype in size reference to a coin, the prototype having two pheromone dispensers, each equipped with a coiled tubing fluid reservoir.

FIG. 11 illustrates a rectangular prototype 110 with two ejection devices 1 each having its own coiled tube reservoir 112 for each dispenser, shown in relation to the size of a quarter coin 114 to illustrate the miniaturization that is possible with these devices. A rectangular case 111 contains two ejection devices 1 which dispense onto a "wick" 118 in an opening 120. Space 122 may contain circuitry and drive electronics, chips and connections 124 for power, etc. This illustrates that an electronically activated dispenser 15, 61 may contain a plurality of ejection devices and a plurality of reservoirs 7, 112 with each ejection device in fluid communication with one of the reservoirs. Each reservoir may contain a different pest specific volatile fluid and each ejection device can operate independently in response to signals from control unit 18 so that the pest control techniques disclosed herein can be applied at different times or even at the same time to control more than one species of pest. The dispensers can have multiple orifices in a single assembly as a same or multifluid jetting device as shown in U.S. Pat. No. 5,402,162 incorporated herein by reference.

The special coiled tube reservoir 112 is, of course, connected in fluid communication with its jetting device. An operating advantage arises from its compactness while still holding a good quantity of pheromone fluid and from its ability to be laid flat in operation as shown in FIG. 11 so that the maximum fluid "head" developed is limited to the diameter of the tiny coils. This prevents interference with efficient and continuous jetting that can arise from a variable head of fluid which might develop as pheromone level decreases in a reservoir. The coil tube reservoir reduces the chance that jetting would cease before the fluid in the reservoir is exhausted. Further explanation of this device is included in U.S. patent application Ser. No. 08/837,646, filed Apr. 21, 1997, entitle "Presenting Airborne Material to the Nose" which is incorporated herein by reference.

Although the invention has been disclosed above with regard to a particular and preferred embodiment, it is not intended to limit the scope of this invention. For instance, although the inventive method has been set forth in a prescribed sequence of steps, it is understood that the disclosed sequence of steps may be varied. It will be appreciated that various modifications, alternative,s variations, etc., may be made without departing from the spirit and scope of the invention as defined in the appended claims.

What is claimed is:

1. An apparatus for controlling pests by controlled dispensing of pest specific fluids selected to predictably alter the physiology or behavior of agricultural pests, comprising:
   an electronically actuated dispenser having a fluid reservoir and an ejection device with an orifice in fluid communication with the fluid reservoir wherein said dispenser is configured to eject a series of micro-droplets of reservoir fluid of selected uniform diameter less than about 500 microns;
   the reservoir being a sealed reservoir except for a path of fluid communication to the ejection device;
   a pest specific volatile fluid within said reservoir, the fluid being selected to predictably alter the physiology or behavior of pests;
   a control unit including drive electronics operably connected to the ejection device to actuate the dispenser during select time intervals in such a manner as to produce a succession of individual micro-droplets of said selected uniform diameter which are ejected from the orifice at a rate sufficient to release a desired amount of the volatile fluid at a uniform rate during the selected time intervals, in order to control pests; and
   a shutter operated by signals from the control unit wherein said orifice is covered by the shutter when the dispenser is not operating.

2. The apparatus of claim 1 further including a wick mounted with the dispenser such that fluid dispensed from the orifice is directed onto said wick where it spreads by natural action over an area for rapid vaporization into the air.

3. The apparatus of claim 1 wherein the electronically actuated dispenser comprises a dispenser having an ejection device selected from the group consisting of piezoelectric, magnetorestrictive, inductive, thermal and fast solenoid valve dispensing devices.

4. The apparatus of claim 1 wherein the control unit includes drive electronics configured to dispense fluid uniformly from said ejection device by operating said device at a rate selected to be less than about 4000 micro-droplets per second during the selected time intervals.

5. The apparatus of claim 4 wherein said ejection device is a piezoelectric ejection device with said control unit drive electronics selected to operate in drop on demand mode.

6. The apparatus of claim 1 wherein the control unit includes drive electronics configured to dispense fluid uniformly from said ejection device by operating said device at a rate selected to be less than about 25,000 micro-droplets per second during the selected time intervals.

7. An apparatus for controlling pests by controlled dispensing of pest specific fluids selected to predictably alter the physiology or behavior of agricultural pests, comprising:
   an electronically actuated dispenser having a fluid reservoir and an ejection device with an orifice in fluid communication with the fluid reservoir, wherein said dispenser is configured to eject a series of micro-droplets of reservoir fluid of selected uniform diameter;
   the reservoir being a sealed reservoir except for a path of fluid communication to the ejection device;
   a pest specific volatile fluid within said reservoir, the fluid being selected to predictably alter the physiology or behavior of pests;
   the dispenser including at least one sensor adapted to create a signal indicative of an environmental condition parameter and an electrical circuit having a power supply connected to said sensor and a control unit;
   the control unit including drive electronics operably connected to the ejection device to actuate the dispenser during selected time intervals in such a manner as to produce a succession of individual micro-droplets of said selected uniform diameter which are ejected from the orifice at a rate sufficient to release a desired amount of the volatile fluid at a uniform rate during the selected time intervals, in order to control pests; and
   the control unit includes a digital computing device programmed to use the signal from the at least one environmental condition parameter sensor to operate the dispenser in a manner that varies in response to the signal received from the at least one sensor.

8. The apparatus of claim 7 further including a radio receiver operably connected in the circuit with the power supply and the digital computing device of the control unit wherein said digital computing device is programmed to receive signals from the at least one sensor and the receiver and to use said signals in a manner that uses the signal indicative of an environmental condition parameter or the signal from the receiver or both to operate the dispenser.

9. The apparatus of claim 8 wherein said radio receiver is a two way radio which in combination with said digital computing device is capable of being interrogated by radio frequency signals at a distance to provide signals representative of the input from the at least one sensor and the dispenser operating condition whereby said dispenser can be operated by communication signals from a remote transmitter.

10. An apparatus for altering pest behavior by controlled dispensing of small quantities of pest specific fluid comprising:
   an electrically controlled dispenser equipped with a signal processor and power source operatively connected to an electronic drive circuit coupled to an electrically activated ejection head having a micro-dispensing tube in fluid communication with a reservoir containing pest specific volatile fluid selected to produce altered behavior in the specific pest;

an electrical signal generator at a location isolated from said dispenser which is adapted to operate said dispenser to eject a succession of individual micro-droplets of the pest specific volatile fluid from the ejection head in an amount and rate sufficient to alter pest behavior; and said dispenser being operable in response to electrical signals generated by said electrical signal generator at said location isolated from said dispenser to eject a succession of individual micro-droplets of said pest specific fluid from the ejection head in an amount and rate sufficient to alter pest behavior.

11. An apparatus for controlling pests by controlled dispensing of pest specific fluids selected to predictably alter the physiology or behavior of agricultural pests, comprising:

an electronically actuated dispenser having a plurality of ejection devices each having a fluid reservoir and an orifice in fluid communication with its fluid reservoir, wherein said plurality of ejection devices are configured to eject a series of micro-droplets of reservoir fluid of selected uniform diameter less than about 500 microns and at least two of said reservoirs have a different pest specific volatile fluid, said fluids being selected to predictably alter the physiology or behavior of different pests;

a control unit for the electronically actuated dispenser having drive electronics for each ejection device capable of operating one or more of said ejection devices independently from the other ejection devices during selected time intervals in such a manner as to produce a succession of individual micro-droplets of said selected uniform diameter which are ejected from the orifices of ejection devices connected to said at least two of said reservoirs at a rate sufficient to release the desired amount of the volatile fluid at a uniform rate during the selected time intervals, to control the physiology or behavior of more than one kind of agricultural pest.

12. The apparatus of claim 11 wherein the control unit can be programmed to operate more than one ejection device simultaneously, to enable operating to control different pests simultaneously, or to multiply the concentration if fluid from reservoirs containing like volatile fluids is simultaneously ejected.

13. An apparatus for controlling pests by controlled dispensing of pest specific fluids selected to predictably alter the physiology or behavior of agricultural pests, comprising:

a plurality of spaced apart electronically actuated dispensers each having a fluid reservoir for pest specific volatile fluid and an ejection device with an orifice in fluid communication with the fluid reservoir, wherein said dispensers are configured to eject a series of micro-droplets of reservoir fluid of a diameter of a selected size which is less than about 500 microns;

each dispenser including a control unit having drive electronics with a source of power operably connected to each ejection device to actuate the dispenser during a selected time interval in such manner as to produce a succession of individual micro-droplets of the selected size which are ejected from the orifice of each dispenser at a rate sufficient to release a desired amount of the volatile fluid during the selected time interval;

a master control station communicating with each of the plurality of dispensers programmed to operate the plurality of dispensers through the control units by means of a programmed computer which can operate the dispensers according to a schedule from a distance.

14. The apparatus of claim 13 wherein the plurality of electronically actuated spaced apart dispensers communicate with the master control station through a wiring system.

15. The apparatus of claim 13 wherein the control unit of each dispenser has an electromagnetically activated receiver through which its drive electronics can be controlled from a transmitting station operably connected with said master control station and provided with a narrow-cast or broadcast transmitter communicating with the receiver of each control unit whereby the dispensers can be operated according to said schedule.

16. The apparatus of claim 15 further including an environmental monitoring station in communication with said master control station, capable of monitoring an environmental condition parameter and communicating a signal representative of the state of said parameter to the programmed computer in said control station whereby the state of an environmental condition parameter can be taken into account in operating the dispensers.

17. The apparatus of claim 16 wherein the environmental monitoring station is capable of monitoring the status of an environmental condition parameter selected from a group comprising humidity, wind speed, wind direction and temperature, and communicating a signal representative of one or more of said parameters to the master control station.

18. The apparatus of claim 16 further including a communication satellite and communication equipment whereby the satellite interrogates and receives data from the environmental monitoring station, transmits the data received from the environmental monitoring station to the master control station and receives commands therefrom which are retransmitted to the plurality of dispensers.

19. The apparatus of claim 13 wherein said each dispenser includes a radio receiver, at least one sensor to create a signal indicative of an environmental condition parameter and a power supply operably connected to said receiver, and said control unit includes a digital computing device programmed to use the signal from the at least one sensor to operate its dispenser in response to data as represented by the signal received from the at least one sensor.

20. The apparatus of claim 19 further including said each radio receiver being operably connected in a circuit to the power supply and the digital computing device of the control unit and capable of receiving operating signals from a transmitter in operable communication with said control station, the digital computing device being programmed to receive signals from the at least one sensor and the receiver and to use said signals in a manner that uses the signal indicative of an environmental condition parameter or a signal from the master control station or both to operate the dispenser.

21. The apparatus of claim 20 wherein said radio receiver is a two way radio which in combination with said digital computing device is capable of being interrogated by radio frequency signals at a distance by providing signals representative of the input from the at least one sensor and the dispenser operating condition whereby said dispenser can be operated by communication signals sent from a remote transmitter.

22. A method of controlling pests by controlled dispensing of pest specific fluids selected to predictably alter the physiology or behavior of agricultural pests, comprising the steps of:

providing an electronically actuated dispenser having an ejection device with an orifice in fluid communication with a fluid reservoir wherein said dispenser is configured to eject a series of uniform micro-droplets of a selected diameter less than about 500 microns;

providing a pest specific volatile fluid in the reservoir, the fluid being selected to predictably alter the physiology or behavior of pests;

providing a control unit to actuate the dispenser during selected time intervals to produce successive individual micro-droplets of uniform size of the selected diameter;

providing a wick;

operating the dispenser through the control unit whereby a succession of individual micro-droplets of said selected uniform size are ejected from the orifice at a rate sufficient to release the desired amount of pest specific volatile fluid over the selected time intervals at a uniform rate are deposited onto the wick for efficient volatilization in order to control pests.

23. The method of claim 22 wherein the step of providing an electronically actuated dispenser comprises providing an electronically actuated ejection device selected from the group consisting of piezoelectric, magnetorestrictive, inductive, thermal and fast solenoid valve dispensing devices.

24. The method of claim 22 wherein the step of providing an electronically actuated dispenser includes the step of providing an electronic drive system that can dispense fluid from the ejection device at rates less than about 4000 micro-droplets per second and the step of operating said dispenser comprises the step of dispensing said micro-droplets at a rate of less than about 4000 micro-droplets per second.

25. The method of claim 22 wherein the step of providing an electronically actuated dispenser comprises the step of providing an electronic drive system that can dispense fluid from the ejection device at less than about 25,000 micro-droplets per second and the step of operating said dispenser comprises the step of dispensing said micro-droplets at a rate less than about 25,000 micro-droplets per second.

26. A method of controlling pests by controlled dispensing of pest specific fluids selected to predictably alter the physiology or behavior of agricultural pests, comprising the steps of:

providing an electronically actuated dispenser having an ejection device with an orifice in fluid communication with a fluid reservoir wherein said dispenser is configured to eject a series of uniform micro-droplets of a selected diameter less than about 500 microns;

providing a pest specific volatile fluid in the reservoir, the fluid being selected to predictably alter the physiology or behavior of pests;

providing a control unit to actuate the dispenser during selected time intervals to produce successive individual micro-droplets of uniform size of the selected diameter;

providing a shutter operated by the control unit to cover and uncover said orifice;

uncovering said orifice;

operating the dispenser through the control unit whereby a succession of individual micro-droplets of said selected uniform size are ejected from the orifice at a rate sufficient to release the desired amount of the volatile fluid over the selected time intervals at a uniform rate in order to control pests.

27. The method of claim 26 wherein the step of uncovering said orifice includes providing a piezoelectric shutter operator and sending an operating signal from the control unit to the shutter operator.

28. The method of claim 26 wherein the step of providing an electronically actuated dispenser comprises providing an electronically actuated ejection device selected from the group consisting of piezoelectric, magnetorestrictive, inductive, thermal and fast solenoid valve dispensing devices.

29. A method of altering pest behavior by controlled dispensing of small quantities of pest specific fluid comprising the steps of:

providing an electrically controlled dispenser equipped with a signal processor and power source operatively connected to an electronic drive circuit coupled to an electrically activated ejection head having a micro dispensing tube in fluid communication with a reservoir containing pest specific fluid selected to produce altered behavior in the specific pests;

providing an electrical signal generator at a separate location from said dispenser which is adapted to operate said dispenser to eject a succession of individual micro-droplets of the pest specific fluid from the ejection head in an amount and rate sufficient to alter pest behavior; and operating said dispenser in response to electrical signals generated by said electrical signal generator at the separate location from said dispenser to eject a succession of individual micro-droplets of pest specific fluid from the ejection head in an amount and rate sufficient to alter pest behavior.

30. A method of controlling pests by controlled dispensing of pest specific fluids selected to predictably alter the physiology or behavior of agricultural pests, comprising the steps of:

providing a plurality of electronically actuated ejection devices and a plurality of reservoirs with each ejection device in fluid communication with one of the reservoirs configured to eject a series of uniform micro-droplets of a selected diameter less than about 500 microns from an orifice;

providing different pest specific volatile fluids in at least some of the plurality of reservoirs, the fluids being selected to predictably alter the physiology or behavior of pests;

providing a control unit to actuate the ejection devices during selected time intervals to produce successive individual micro-droplets of a uniform size of the selected diameter;

operating an ejection device selected from the plurality of ejection devices whereby a succession of individual micro-droplets of said selected uniform size are ejected from the orifice at a rate sufficient to release a desired amount of the volatile fluid over a selected time interval at a uniform rate, in order to control pests.

31. The method of claim 30 wherein the step of operating an ejection device comprises the step of selecting more than one ejection device to operate.

32. The method of claim 31 wherein the step of selecting more than one ejection device further comprises operating the selected ejection devices during different time intervals.

33. A method of controlling pests by controlling dispensing of pest specific fluids selected to predictably alter the physiology or behavior of agricultural pests, comprising the steps of:

providing an electronically actuated dispenser having a plurality of ejection devices each with an orifice and a plurality of reservoirs with each ejection device in fluid communication with one of the reservoirs wherein said dispenser is configured to eject a series of uniform micro-droplets of a selected diameter less than about 500 microns from any of the ejection devices;

providing different pest specific volatile fluids in some of the plurality of reservoirs, said fluids being selected to predictably alter the physiology or behavior of different pests;

providing a control unit to actuate the dispenser during selected time intervals to produce successive individual micro-droplets of a uniform size of the selected diameter from one or more of the ejection devices;

operating the dispenser through the control unit whereby a succession of individual micro-droplets of said selected uniform size are ejected from the orifice of a selected ejection device at a rate sufficient to release a desired amount of the volatile fluid over the selected time intervals at a uniform rate, in order to control a particular pest.

34. The method of claim 33 wherein at least one of the ejection devices has multiple orifices in fluid communication with one of the reservoirs.

35. A method of controlling pests by controlled dispensing of pest specific fluids selected to predictably alter the physiology or behavior of agricultural pests, comprising the steps of:

providing a plurality of dispersed electronically actuated dispensers each having an ejection device with an orifice in fluid communication with a fluid reservoir wherein said dispensers are configured to eject a series of uniform micro-droplets of a selected diameter less than about 500 microns, said dispensers being dispersed in a pattern over an area to be protected;

providing a pest specific volatile fluid in the reservoirs of the dispensers, the fluid being selected to predictably alter the physiology or behavior of pests;

providing a control unit to actuate the dispersed dispensers during selected time intervals to produce successive individual micro-droplets of a uniform size of the selected diameter;

operating the plurality of dispensers through the control unit whereby a succession of individual micro-droplets of said selected uniform size are ejected from the orifices at rates sufficient to release a desired amount of the volatile fluid over the selected time intervals at a uniform rate in order to control pests in the area to be protected.

36. The method of claim 35 wherein the step of providing a control unit comprises the step of providing a power supply and a timer control operably connected to each dispenser and the step of operating the plurality of dispensers is carried out in response to output signals from the timer.

37. The method of claim 35 wherein the step of providing a control unit comprises the step of providing ones of the plurality of dispensers with an electromagnetically activated receiver and driving circuit which operate the dispensers and providing a remote electromagnetic transmitter and the step of operating said dispensers through said control unit comprises the step of operating said dispensers in response to signals received by said receivers from said transmitter.

38. The method of claim 37 further including an environmental monitoring station which communicates with the transmitter, capable of monitoring an environmental condition parameter and a digital computing device programmed to evaluate said communications and provide operating data based upon said communications to said transmitter wherein the step of operating said dispensers in response to signals includes the step operating said transmitter in response to communication from the environmental station of the state of said environmental condition parameter.

39. The method of claim 38 wherein the environmental condition parameter monitored by the environmental monitoring station is selected from a group comprising humidity, wind speed, wind direction and temperature, wherein the operating data being communicated to said transmitter is adjusted based on the state of one or more of said parameters.

* * * * *